No. 750,687. Patented January 26, 1904.

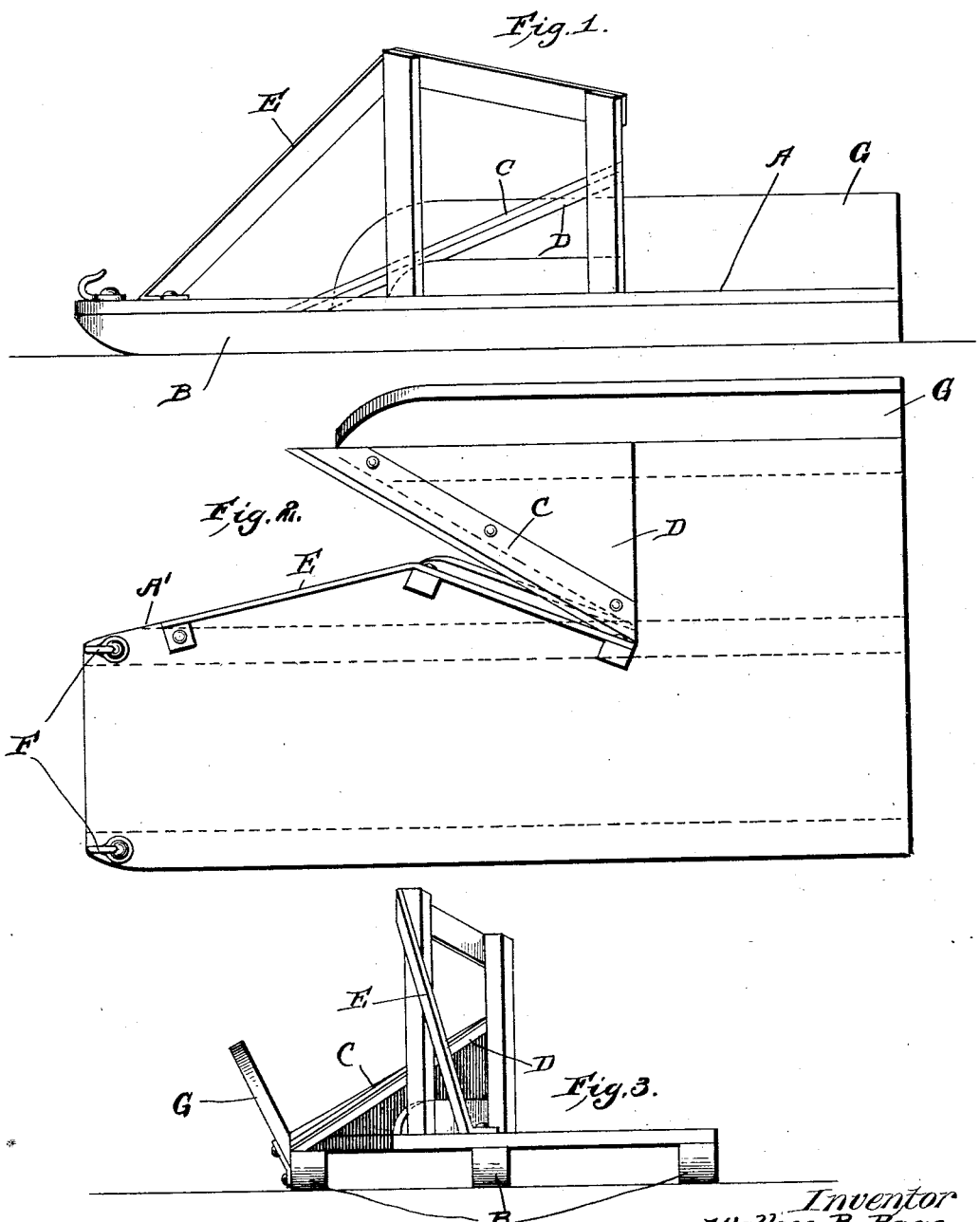

UNITED STATES PATENT OFFICE.

WALLACE R. PAGE, OF NORTH SALEM, INDIANA.

CORN-HARVESTER.

SPECIFICATION forming part of Letters Patent No. 750,687, dated January 26, 1904.

Application filed May 6, 1903. Serial No. 155,830. (No model.)

*To all whom it may concern:*

Be it known that I, WALLACE R. PAGE, a citizen of the United States, residing at North Salem, county of Hendricks, and State of Indiana, have invented a certain new and useful Improvement in Corn-Harvesters, of which the following is a specification.

My invention relates to a new and useful improvement in corn-harvesters, and has for its object to provide an apparatus designed to cut the cornstalks as the same is propelled through a field, and the whole apparatus is extremely simple, consisting of a few parts, so that the same can be manufactured at a comparatively small cost, and at the same time it is very efficient and positive in operation.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this specification, in which—

Figure 1 represents a side elevation of my improved harvester; Fig. 2, a plan view of the same; Fig. 3, a front elevation of the harvester.

A represents the platform of the machine, which is supported upon runners B. There may be any number of these runners used and arranged in any position so long as they straddle the row of cornstalks to be cut.

C is the knife, which is designed to be removably secured to the knife-support D, and this support is of such a shape that the knife will be held at an angle both horizontally and vertically—that is, the knife will incline from the forward end at one side of the machine and rearward toward the center of the machine and also will incline from the forward end upward toward the rear of the machine, so that the heel end of the knife is raised considerably above the forward end. It will thus be seen that the knife will have a shearing action in two different directions.

The platform A is so formed at is forward portion as to provide a guiding edge A' to force the cornstalks in toward the knife. This guiding edge A' is at a different angle to the knife, so that the guiding edge A' and knife will approach one another, and at a point near the plane of the cutting edge of the knife the angle of this guiding edge changes, so that it extends almost parallel with the cutting edge of the knife; but there is still sufficient contact between the knife and the guiding edge, so that in looking downward the knife-edge will cross the guiding edge, and at this point the cornstalks will be severed.

E is a guard-rail extending up above the platform and arranged parallel with the guiding edge A'. This guide-rail is for the purpose of supporting and guiding the stalks and holding the same upright while being cut.

In operation the horses are attached to the apparatus at the points F upon one side, so that said horses will travel alongside of the row of corn being cut and between that row and the next succeeding row, and as the harvester is dragged forward the cornstalks will be guided in toward the knife and when cut will fall toward the platform, where they will be handled by a man traveling with the machine, the man standing behind the guard-rail E.

G is a side-board extending upward from the platform upon that side on which the knife is located. This side-board is for the purpose of preventing the stalks from sliding off over the side.

While I have shown the machine made for cutting only a single row of stalks at a time, it is obvious that another cutting-knife could be arranged upon the opposite side of the machine by making the machine broader, so that the horses would travel between two rows, when both rows would be cut at the same time by the harvester.

Of course I do not wish to be limited to the exact construction here shown, as slight modifications could be made without departing from the spirit of my invention.

Having thus fully described my invention, what I claim as new and useful is—

In a corn-harvester of the character described, a platform, a series of longitudinal runners upon which the platform is supported, a knife secured to said platform, the cutting edge of said knife extending from the forward end of the machine upon one side rearward in a diagonal direction toward the center of the machine, and also at the same time extending upward in an inclined position from the forward to the rearward end, a guiding edge formed on the platform, the rearward portion of said guiding edge extending underneath the knife at an angle, said guiding edge being for the purpose of guiding the stalks in toward the knife and causing the same to be severed between the knife and the guiding edge, a guard-rail extending upward from the platform and arranged parallel with the guiding edge, and a side-board secured on the side of the machine upon which the knife is located, as and for the purpose specified.

In testimony whereof I have hereunto affixed my signature in the presence of two subscribing witnesses.

WALLACE R. PAGE.

Witnesses:
 STANLEY SANDERS,
 P. M. PAGE.